United States Patent [19]
Tsuzuki et al.

[11] Patent Number: 5,541,384
[45] Date of Patent: Jul. 30, 1996

[54] METHOD AND APPARATUS FOR WELDING

[75] Inventors: Toshihiko Tsuzuki; Yasuo Kotetsu; Mitsuhiro Kanou, all of Kariya, Japan

[73] Assignee: Kabushiki Kaisha Toyoda Jidoshokki Seisakusho, Kariya, Japan

[21] Appl. No.: 222,678

[22] Filed: Apr. 4, 1994

[30] Foreign Application Priority Data

Apr. 6, 1993 [JP] Japan ........................... 5-079841

[51] Int. Cl.⁶ ..................... B23K 11/11; B23K 11/14
[52] U.S. Cl. ................... 219/117.1; 219/86.24; 219/91.2; 219/93
[58] Field of Search ................. 219/86.24, 91.2, 219/93, 117.1

[56] References Cited

U.S. PATENT DOCUMENTS

| | | | |
|---|---|---|---|
| 3,952,395 | 4/1976 | Crossman et al. | 29/401 |
| 4,752,026 | 6/1988 | Van De Griend | 228/120 |
| 5,113,054 | 5/1992 | Hund et al. | 219/117.1 |

*Primary Examiner*—Teresa J. Walberg
*Assistant Examiner*—J. Pelham
*Attorney, Agent, or Firm*—Brooks Haidt Haffner & Delahunty

[57] ABSTRACT

A method of joining a ball member to an end of a cylindrical matrix plunger body by resistance welding thereby to make a plunger for use in a directional control valve for controlling fluid communication in said valve is disclosed. A resistance welder for the method has a pair of electrodes. The ball member is placed in contact with a conical recess within the matrix plunger body and with a conforming surface of one of said electrodes so as to form a circular first contact between the ball member and the matrix plunger body and a spherical second contact between the ball member and the one electrode such that electrical contact resistance at the first contact is greater than that at the second contact. Then, an electric current at a constant rate flows for a controlled period of time through the first and second contacts with the ball member which is kept in contact with the matrix plunger body under pressure by the electrode. When the electric current passes through the electrodes, the greatest resistance and hence the greatest heating effect takes place at the first contact, where a solid-phase joint is formed.

5 Claims, 6 Drawing Sheets

METHOD AND APPARATUS FOR WELDING

BACKGROUND OF THE INVENTION

The present invention relates generally to a method and an apparatus for welding a spherical metal to a matrix metal using electrical-resistance welding. More particularly, it relates to a method and an apparatus for welding a ball member to an end of a matrix cylindrical body to make a plunger which is adapted for use in a directional control valve for controlling fluid communication in the valve.

Figure 1:
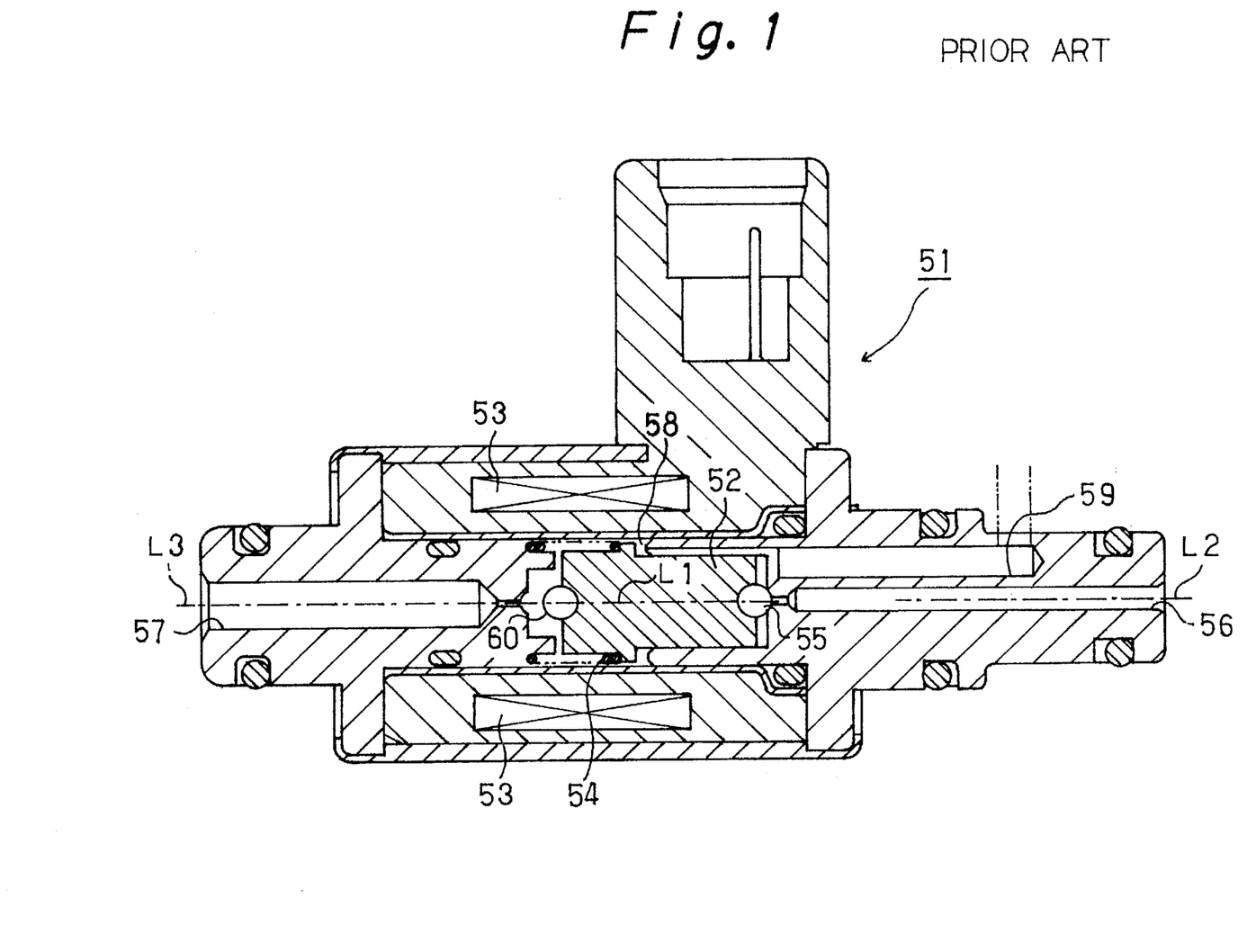
FIG. 1 is an illustrative view in cross section, showing a typical solenoid-operated directional control valve having therein a plunger with two balls joined to its opposite ends by prior art welding.

For aiding in understanding of the present invention and an application thereof, reference is made firstly to FIG. 1 which shows a typical solenoid-operated directional control valve 51 which has formed therein a first fluid passage 56, a second fluid passage 57 and a third fluid passage 59 and also contains therein a displaceable cylindrical plunger 52 of prior art having joined to its opposite ends a pair of spherical balls 55, 60. In normal position of the valve 51 when its solenoid 53 is in deenergized, or off, state, the plunger 52 is urged by the tension of a coil spring 54 to be positioned such that the ball 55 on the right end of the plunger closes the port of the first fluid passage 56 and the other ball 60 on the left end of the plunger keeps open the port of the second fluid passage 57, so that the third fluid passage 59 is in communication with the second passage through a plunger chamber 58 in which the plunger 52 is displaceably mounted, as shown in FIG. 1. When the solenoid 53 is energized, on the other hand, the plunger 52 is shifted leftward by the electromagnetic force created by the then energized solenoid while overcoming the spring tension until its ball 60 on the left end closes the port of the second fluid passage 57 to shut off its communication with the plunger chamber 58, and the first fluid passage 56 is opened to the plunger chamber 58 so that a fluid communication is then made between the first and third passages 56, 59.

Figure 2:
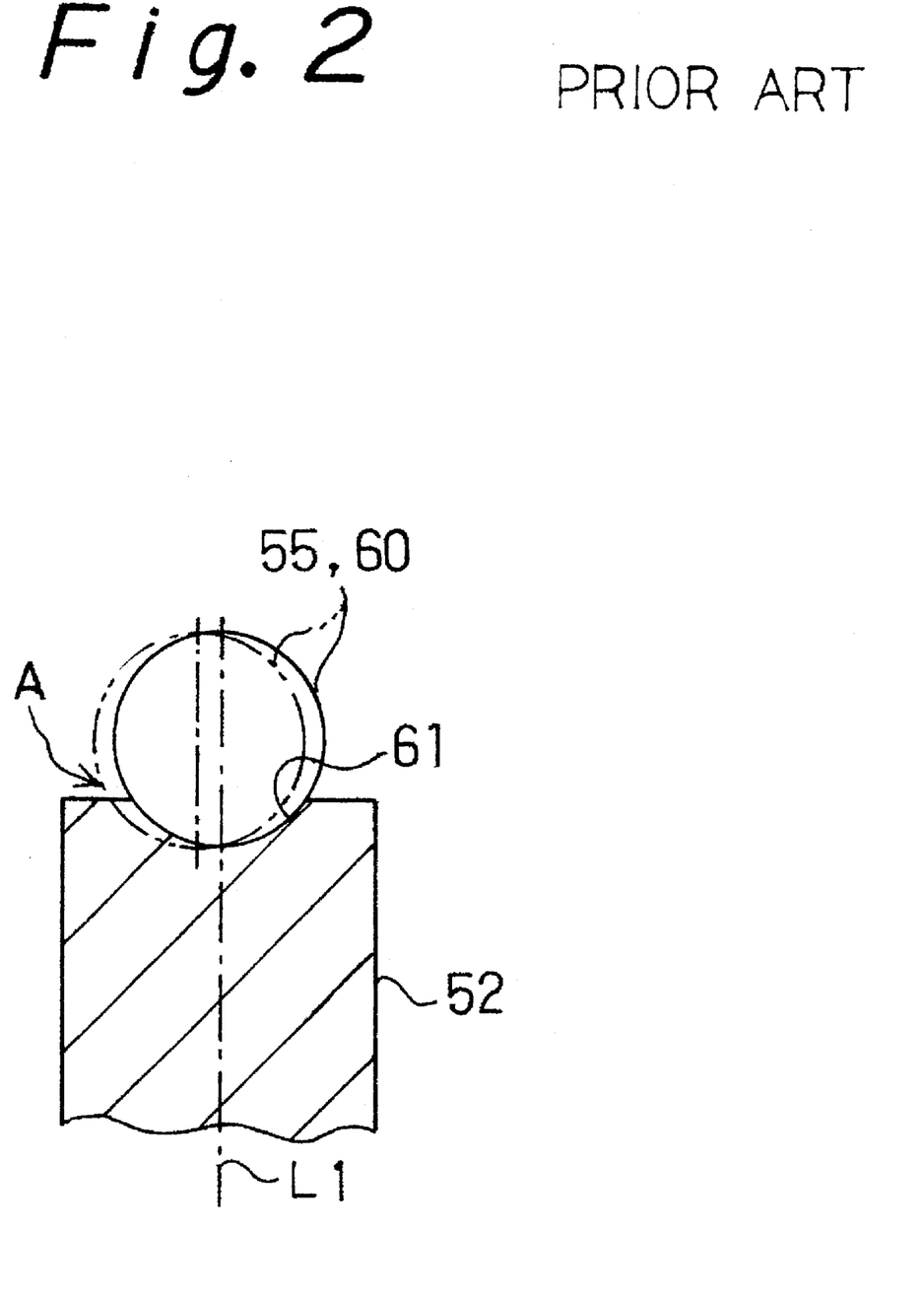
FIG. 2 is a fragmentary cross-sectional view showing one of the balls and part of the plunger body of FIG. 1 to illustrate the radial displacement of the ball due to the stress in the weld.

Referring specifically to the plunger 52 of the prior art, it has formed at each end thereof an inward recess 61 having respective spherical surfaces conforming to those of the balls 55, 60 for receiving therein part of the ball. As indicated by solid lines in FIG. 2, the recess 61 is formed with its center located on the axial center line L1 of the plunger 52, which center line L1 is in turn in alignment with the axial center lines L2, L3 of the first and second fluid passages 56, 57 in the valve, respectively, as shown in FIG. 1, so that the balls 55, 60 joined to the cylindrical plunger body close sealingly the ports of the fluid passages 56, 57.

According to a conventional method to fix the balls, each ball is placed in its corresponding recess 61 and joined to the plunger body 52 by laser welding the adjoining area between the ball and the radially outer circular edge of the recess. The welding is started from any convenient location, e.g. a point as indicated by arrow A in FIG. 2, and performed along and throughout a circular line of the above adjoining area.

In the laser welding which is carried out in a continuous manner along the circular line and causes the metal to be fused or melted by application of welding heat, however, a portion welded earlier naturally solidifies earlier than the other portions which are welded later. In welding the balls to the plunger body, the difference in solidification time produces a tensile stress in the weld which may cause the ball to be displaced radially as indicated by a phantom circle in FIG. 2. Such displacement of the ball causes its center line to be offset from the center lines L1–L3 of the plunger body and hence from the first and second fluid passages 56, 57, with the result that the ball fails to seal tightly its corresponding fluid passage port.

Furthermore, application of the welding heat by the laser welding for fusion of the metal may cause deformation of the balls 55, 60 from their sphericalness, thereby affecting the sealing performance of the plunger in the directional control valve and hence the operation of the valve.

For achieving satisfactory fluid-tight sealing of the fluid passage ports in the valve, it is important that the plunger body 52 have as little error as possible in its axial dimension and also that the balls 55, 60 should be as true as possible in their sphericalness. For the latter purpose, steel balls similar to those employed in a ball bearing may be advantageously used for their high precision in sphericalness. However, these balls are usually made of a high carbon steel and, therefore, offer a disadvantage in that such ball when laser-welded and then cooled is susceptible to harmful cracks.

SUMMARY OF THE INVENTION

It is an object of the present invention, therefore, to provide a method and an apparatus for welding a ball member to a matrix metal without causing deformation of the former or radial displacement thereof relative to the latter.

It is another object of the invention to provide a method and an apparatus for welding a ball member to a matrix metal without causing cracks in the ball member.

In order to achieve the above objects, there is provided a method of welding a metal sphere to a matrix metal by a resistance welder having a pair of electrodes. According to the method, the metal sphere is placed in placed in contact with the matrix metal and with one of the electrodes thereby to form a first contact between the metal sphere and the matrix metal and a second contact between the metal sphere and the one electrode such that electrical contact resistance at the first contact is greater than that at the second contact. Then, with the metal sphere set in contact with the matrix metal under pressure exerted by the electrode, a constant electrical current flows through the first and second contacts for a controlled period of time to form a solid-phase joint at the first contact between the metal sphere and the matrix.

In a preferred embodiment of the present invention, greater resistance at the first contact than at the second contact can be accomplished by forming the matrix metal with a conical recess in which part of the metal sphere is received so that a circular line of contact is formed which provides the above first contact between the spherical metal and the matrix metal, and also by forming the electrode with a recess in which the opposite part of the metal sphere is received and which has a surface substantially conforming to the spherical contour of the spherical metal so that a face-to-face contact is formed which provides the above second contact between the metal sphere and the electrode. When a electric current passes through the electrodes, the greatest resistance and hence the greatest heating effect takes place at the first contact where the weld is to be made. Thus, the first contact is heated by application of the welding current, and such heating produces the solid-phase joint.

In the welding method of the invention, a voltage across the electrodes may be measured when the constant current flows for the welding to check the condition of the weld at the first contact.

There is also disclosed herein a welding apparatus for performing the above-mentioned method. The apparatus includes means for supplying the electric current through the electrodes and controlling the current.

According to the invention, because the entire first contact can be heated simultaneously by application of the welding current only for a controlled period of time, a uniform solid-phase joint can be formed throughout the contact without displacing the spherical metal relative to the matrix metal and the metal sphere can maintain its original sphericalness without being deformed by a stress caused by the heating. By appropriately controlling the period of time of current application, crack formation in the resulting weld can be prevented successfully.

The above and other objects, features and advantages of the invention will become apparent to those skilled in the art from the following description of embodiments of the welding method and apparatus according to the present invention, which description is made with reference to the accompanying drawings, wherein:

DETAILED DESCRIPTION OF THE PREFERRED EMBODIMENTS

Figure 3:
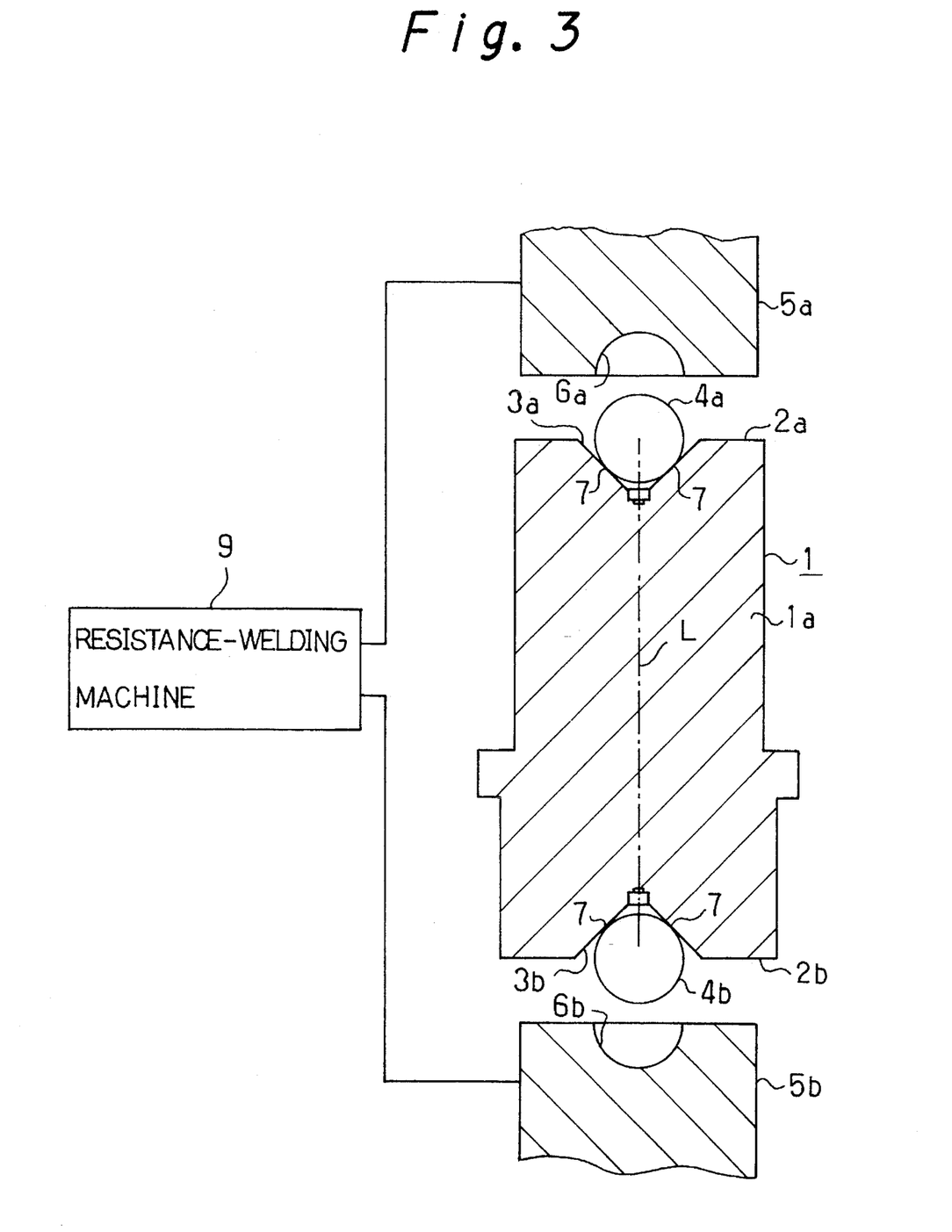
FIG. 3 is a schematic cross-sectional view showing a preferred embodiment of the method and apparatus for welding a metal sphere to a matrix metal according to the present invention.

Referring to FIG. 3 showing a preferred embodiment of the invention, there is shown a plunger 1 adapted for use in a directional control valve as illustrated in FIG. 1 and comprising a cylindrical body 1a made of a mild, magnetic stainless steel and a pair of spherical balls 4a, 4b which are to be joined by welding to the opposite ends 2a, 2b of the plunger body. As the balls 4a, 4b of the plunger 1, high carbon steel balls employed in a ball bearing are used for the reason of their good sphericalness. The opposite ends 2a, 2b of the plunger body 1a are formed with conical recesses 3a, 3b for receiving and locating therein the balls 4a, 4b, respectively. As indicated in FIG. 3, each conical recess 3a, 3b is formed concentrically with the cylindrical plunger body 1a so that the apex of the cone of each recess is located on the axial center line L of the plunger body 1a. In welding the balls 4a, 4b, they are placed in the respective recesses 3a, 3b as shown in FIG. 3, with a circular line of contact 7 formed between each ball and the conical recess in which the ball is received.

Reference symbols 5a, 5b designate electrodes 5a, 5b which are connected to an inverter-controlled resistance-welding machine 9 which also functions as means for controlling an electric current flowing through the electrodes. The electrodes 5a, 5b are made of chromium copper and have formed in the inner ends thereof recesses 6a, 6b each having a spherical surface conforming to that of the balls 4a, 4b so as to receive therein part of the corresponding balls in face-to-face contact therewith, as shown in FIG. 4.

Figure 4:
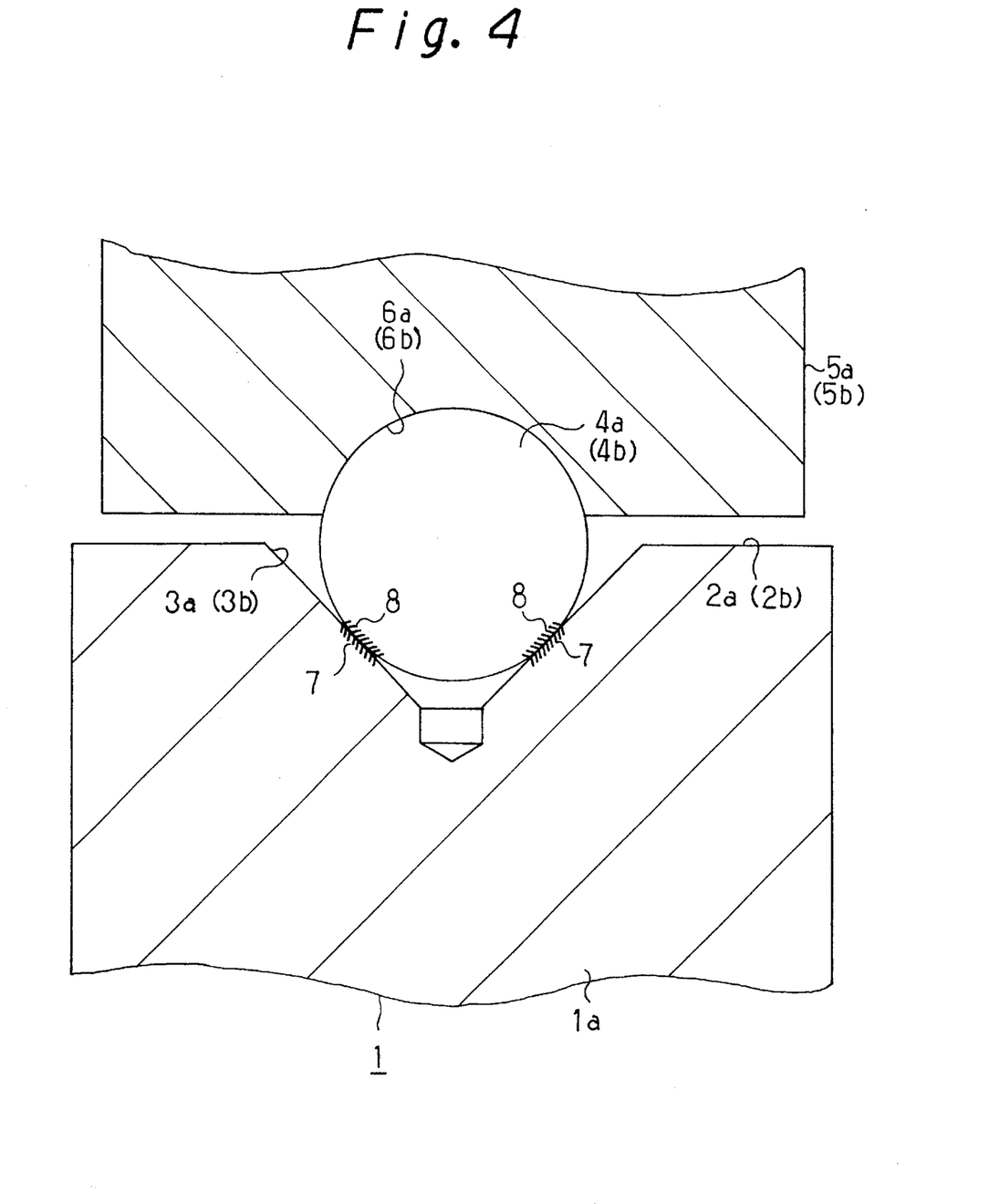
FIG. 4 is a fragmentary cross-sectional view showing a solid-phase joint formed between the plunger body and the ball according to the invention.

For welding to complete the plunger 1, the balls 4a, 4b are placed in the respective conical recesses 3a, 3b of the plunger body 1a and the electrodes 5a, 5b are positioned so as to receive in the spherical recesses 6a, 6b thereof the outer spherical portions of the respective balls as shown in FIG. 4. Then, a constant electrical current of 3 kA which is set by the resistance-welding machine 9 applied through the electrodes 5a, 5b for a few milliseconds while the electrodes are being pressed against the respective balls 4a, 4b. The voltage applied across the electrodes 5a, 5b is less than 4 volts. Thus, the current flows from one electrode 5a to the other electrode 5b through the balls 4a, 4b and the plunger body 1a.

It is noted that, in the state where the electrodes 5a, 5b are set in contact with the balls 4a, 4b under pressure, the electrical resistance at the line contact 7 between the respective balls and the plunger body 1a is greater than that at the face-to-face contact between the balls and the electrodes. When the current passes through the metal, therefore, the greatest resistance is at the line of contact 7; hence, the greatest heating effect takes place at the circular line of contact where the weld is to be made. Thus, the contact 7 between each ball 4a, 4b and the plunger body 1a is heated by application of the current, and such heating produces a solid-phase joint 8, as indicated by hatching in FIG. 4, which unites each ball to the plunger body. Because the current flows through the contacts 7 in a controlled short period of time, the welding can be accomplished without causing fusion to the metal.

As is apparent from the foregoing, simultaneous heating of the entire circular line of contact 7 by application of a welding current through the contact can make possible formation of a uniform solid-phase joint 8 throughout the contact line between each ball and the plunger body without radially displacing the balls relative to the plunger body. Because the current flows only for a controlled period of time and the heating takes place locally at the line of contact 7 without heating a larger area of the ball, the joint can be formed without fusion of the metal and, therefore, the balls can maintain their original sphericality without being deformed by a stress caused by the heating. Additionally, because an electric current for the welding flows only for milliseconds, the time required for completing a weld can be shortened as compared with the conventional laser welding, which can help improve the efficiency in manufacturing of the plungers.

Though a high carbon steel ball of a ball bearing is not a suitable material to be welded to a plunger body 1a which is made of a mild stainless steel, such a ball has an excellent dimensional accuracy which lends itself to application as a port sealing member in a directional control valve. If importance is attached to the dimensional accuracy of the ball, hence to the reliability in the valving operation of the ball, rather than the ease of welding, the above high carbon steel ball can be used advantageously for the purpose. To prevent such ball from being cracked when the weld is being cooled, the time of current application through the contacts 7 may be controlled by a current controlling means so as to prevent rapid cooling of the weld.

Since a constant current flows through the contacts 7 in the above embodiment of resistance welding according to the invention, the voltage across the electrodes 5a, 5b may be measured to figure out the contact resistance between the respective balls 4a, 4b and the plunger body 1a, on the basis of which abnormality of the balls and/or the plunger body, if any is present, can be determined during the welding operation for inspection of the resulting weld.

Figure 5:
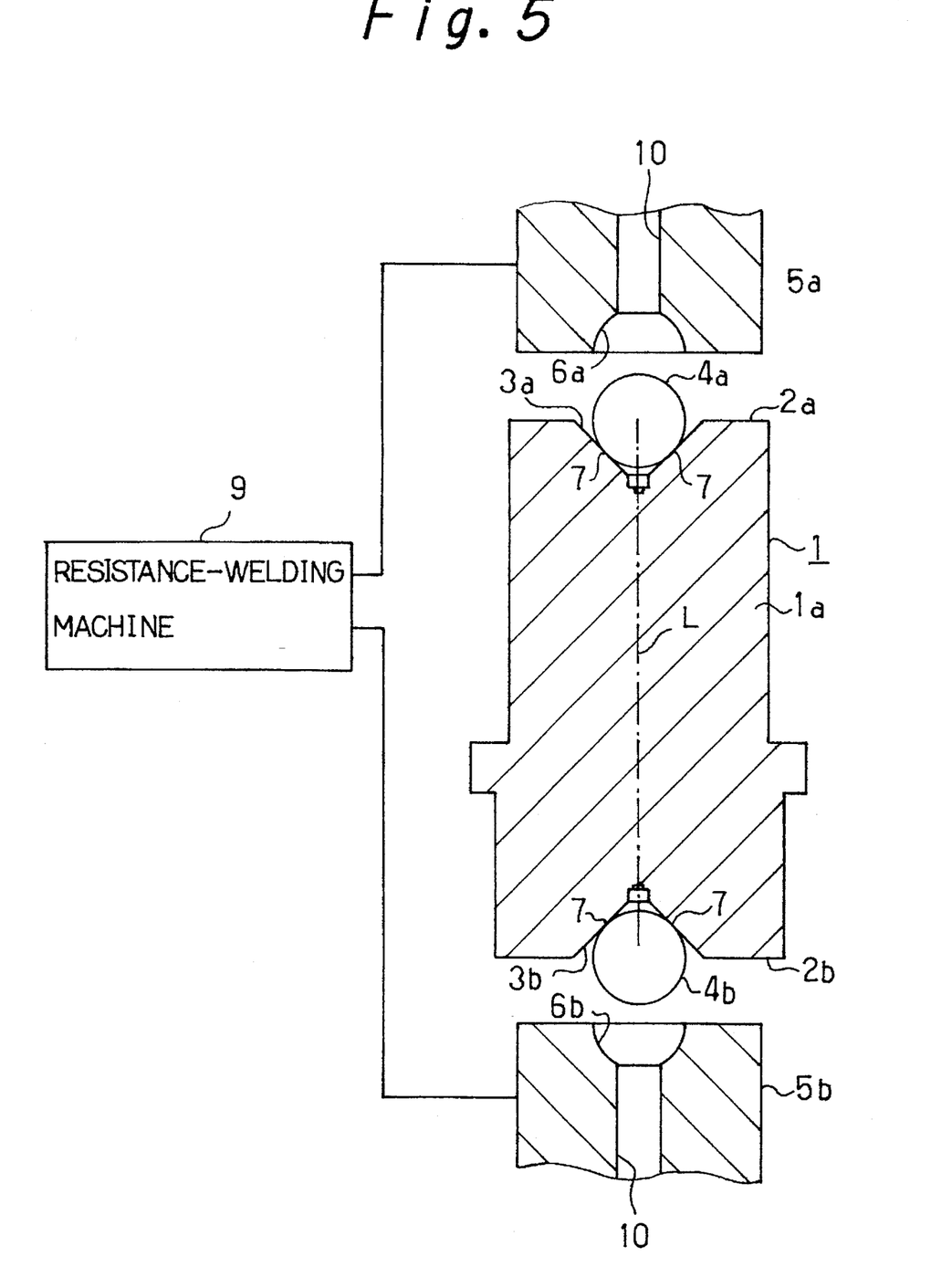
FIG. 5 is a schematic cross section similar to FIG. 3, but showing a modified embodiment of the invention.

Now referring to FIG. 5 showing a modification of the invention, this embodiment differs from that of FIGS. 3 and 4 in that the electrodes 5a, 5b are formed with axial bores 10 which are in direct communication with each spherical recess 6a, 6b, respectively. Each bore 10 may be dimensioned such that the outer portion of the ball's spherical surface which directly closes a fluid passage port in a valve is free from direct contact with the spherical surface of the recess of the electrode for protection of the ball surface from contact under pressure during the welding operation. Such axial bore 10 can also help welding heat to escape therethrough rapidly. It is noted that the axial bore 10 may be substituted by a recess which is formed in the spherical recess 6a, 6b further outward away from the balls.

Figure 6:
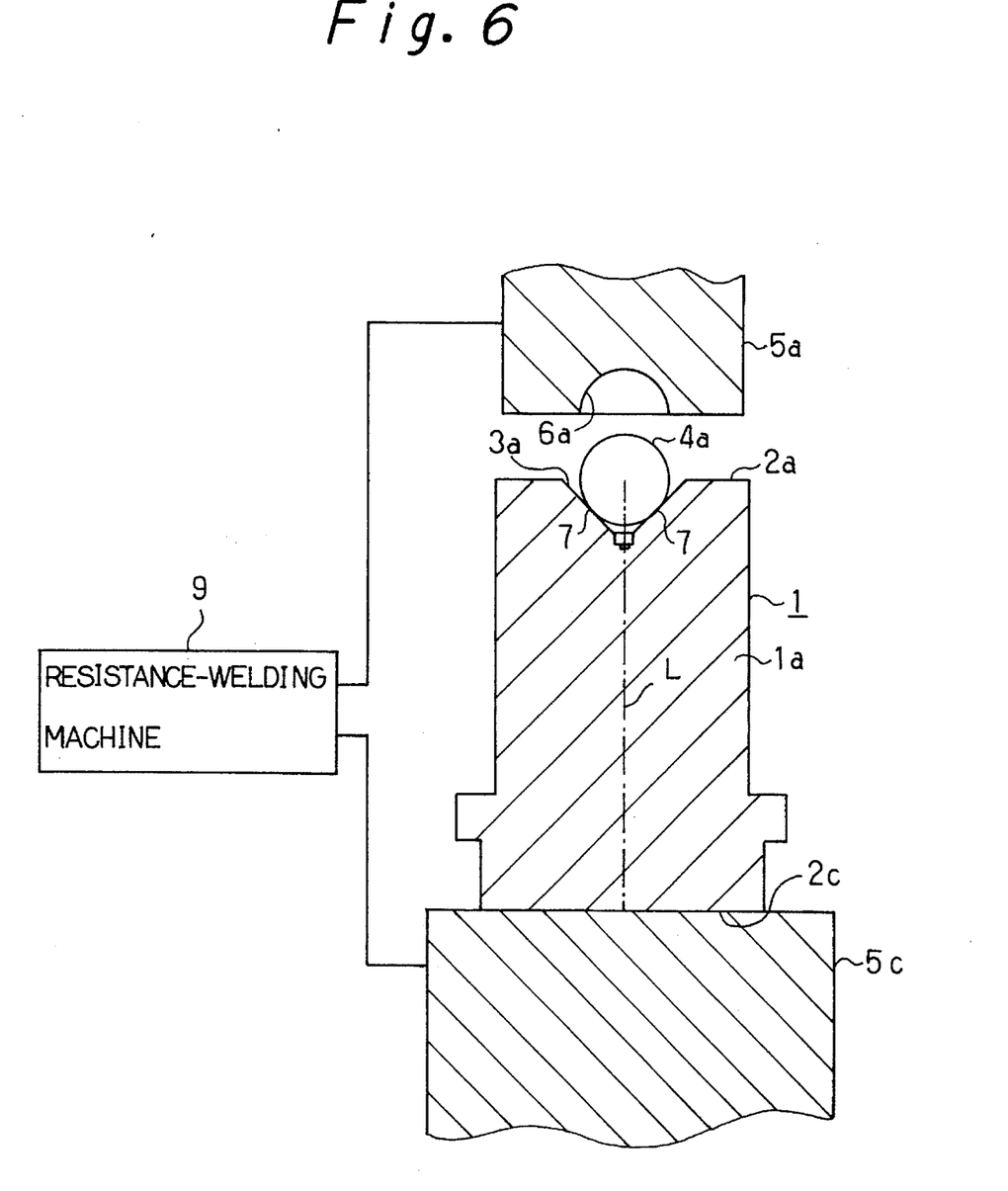
FIG. 6 is a schematic cross section showing still another embodiment of the invention.

Reference is made to FIG. 6 showing an embodiment where a ball 4a is welded to only one end of a plunger body 1a. In this embodiment, the opposite flat end 2c of the plunger body 1a is placed in direct contact with an electrode 5c. With the plunger body 1a set as shown in FIG. 6, the electrode 5a is pressed against the ball 4a and a constant electric current flows through the electrodes 5a, 5c for welding the ball 4a to the one end 2a of the plunger body 1a.

While the invention has been described with reference to specific embodiments, it is to be understood that the present invention can be practiced with various changes and modifications without departing from the spirit or scope thereof, as exemplified below.

Though in the above-described embodiments the locating recesses 3a, 3b are formed with conical shape, it is noted that each ball receiving recess may be formed in the end of the plunger body 1a in a form that conforms to the spherical contour of the ball, provided that the contact resistance between the ball and the plunger body is greater than that between the ball and its corresponding electrode.

The inverter-controlled resistance-welding machine 9 shown in FIGS. 3, 5 and 6 may be substituted by a transistor-controlled resistance welder which can control the time of current flowing through the contacts 7. Furthermore, if any suitable materials are selected for the balls 4a, 4b and the plunger body 1a and there is no fear of 9 crack being formed in the solid-phase joint 8 after cooling of the weld, a capacitor-controlled resistance welder may be used in place of the inverter-controlled type welder.

Though a high carbon steel ball is used for its high dimensional accuracy for each of the balls 4a, 4b to be welded to the plunger body 1a which is made of a mild magnetic stainless steel in the above embodiments, other materials are available not only for the balls, but for the plunger body, if accuracy in the valving operation is not a prime concern, provided that the contact resistance between the balls and the plunger body is greater than that between the balls and the electrodes.

What is claimed is:

1. Method of welding a metal sphere to a matrix metal using a resistance welder having a pair of electrodes comprising:

placing said metal sphere in contact with said matrix metal and with one of said electrodes so as to form a first contact between said metal sphere and said matrix metal and a second contact between said metal sphere and said one electrode, the electrical contact resistance at said first contact being greater than that at said second contact;

flowing high amperage electric current at low voltage through said first and second contacts with said metal sphere pressed against said matrix metal by said one electrode, said flowing of said electric current being for such short time duration that a solid-phase joint is formed without fusion at said first contact.

2. Method of welding according to claim 1, wherein said electric current flows at a constant rate for said time duration.

3. Method of welding according to claim 2, further comprising measuring the voltage across said electrodes while the constant current flows therebetween to determine the condition of the weld.

4. Method of welding according to claim 1, wherein heat is continuously removed from a surface area of said metal sphere via a passageway through said one electrode, an end of said passageway contacting said metal sphere in surrounding relation with said surface area thereof.

5. Method of welding a ball member to an end of a matrix plunger body using a resistance welder having a pair of electrodes thereby to make a plunger for use in a directional control valve for controlling fluid communication in said valve comprising:

forming a conical recess in said end of said matrix plunger body;

placing said ball member within said conical recess in contact with said matrix plunger body and with one of said electrodes so as to form a first contact between said ball member and said matrix plunger body and a second contact between said ball member and said one electrode, the electrical contact resistance at said first contact being greater than that at said second contact;

flowing substantially 3,000 ampere of electric current at substantially 4 volts through said first and second contacts with said ball member pressed against said matrix plunger body by said one electrode, said flowing of said electric current being for a number of milliseconds such that a solid-phase joint is formed without fusion at said first contact.

* * * * *

UNITED STATES PATENT AND TRADEMARK OFFICE
CERTIFICATE OF CORRECTION

PATENT NO. : 5,541,384
DATED : July 30, 1996
INVENTOR(S) : T. Tsuzuki et al

It is certified that error appears in the above-indentified patent and that said Letters Patent is hereby corrected as shown below:

Column 2, line 32, delete "in placed"; line 49 after "metal" delete comma ","; line 55, "a" should read --an--.

Column 5, line 45, "9" should read --a--.

Column 6, line 15, after "flowing" insert --a--; line 47 "ampere" should read --amperes--.

Signed and Sealed this

Eighteenth Day of February, 1997

Attest:

BRUCE LEHMAN

*Attesting Officer*  *Commissioner of Patents and Trademarks*